Patented June 6, 1950

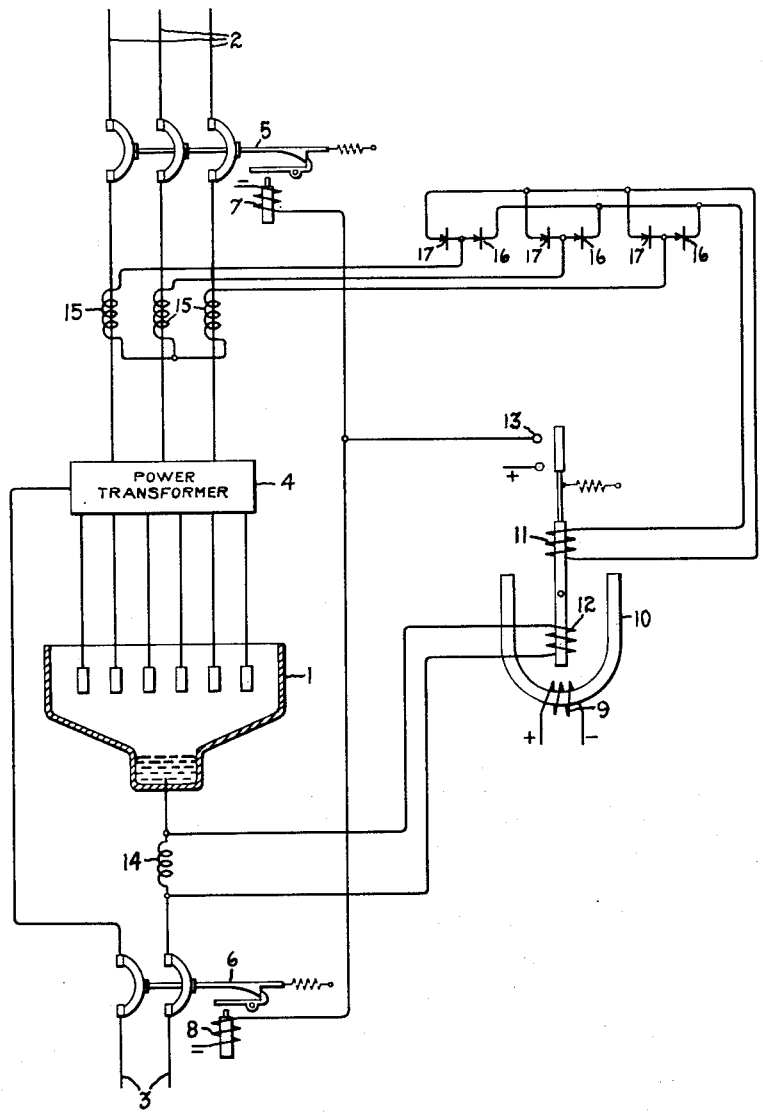

2,510,616

UNITED STATES PATENT OFFICE 2,510,616

DIFFERENTIAL PROTECTIVE ARRANGEMENT

Herman Bany and Harold T. Seeley, Lansdowne, Del., assignors to General Electric Company, a corporation of New York Application April 5, 1946, Serial No. 659,685

1 Claim. (Cl. 321—12)

Our invention relates to differential protective arrangements and particularly to such arrangements for power rectifier installations, and one object of our invention is to provide a new and improved differential protective arrangement for a power rectifier installation which functions to remove the power rectifier from service under predetermined abnormal operating conductions such, for example, as an arc-back in the rectifier or an internal fault in the power transformer supplying current to the rectifier.

In accordance with a preferred embodiment of our invention, we effect the disconnection of the rectifier from service in response to a predetermined differential condition between the magnitude of the alternating current in the input circuit of the power transformer supplying current to the rectifier and the magnitude of the direct current in the output circuit of the rectifier so that protection is obtained for both the rectifier and its power transformer.

Our invention will be better understood from the following description when taken in connection with the accompanying drawing, the single figure of which diagrammatically illustrates a power rectifier differential protective arrangement embodying our invention, and the scope of our invention will be pointed out in the appended claims.

Referring to the drawing, 1 represents a power rectifier which is connected between a polyphase supply circuit 2 and a direct current load circuit 3. The rectifier 1 is connected to the supply circuit 2 through a suitable power transformer 4 and a suitable circuit interrupter 5 in the input circuit of the power transformer 4. A suitable circuit interrupter 6 connects the output circuit of the rectifier 1 to the direct current load circuit 3. The circuit interrupters 5 and 6 are respectively provided with trip coils 7 and 8 which when energized are arranged in any suitable manner to effect the opening of the associated circuit interrupters.

For effecting the energization of the trip coils 7 and 8 in response to predetermined abnormal current conditions in the power transformer 4 and in the rectifier 1, we provide, in accordance with our invention, a relay 10 which is so connected that it responds to a predetermined differential condition of the input current supplied to the power transformer 4 and the output current of the rectifier 1. As shown, the relay 10 includes two operating windings 11 and 12 which are arranged in any suitable manner so that the operation of the relay depends upon the relative directions and magnitudes of the direct currents flowing through these two windings. Preferably the relay 10 is a polarized relay having suitable polarizing means such as the polarizing winding 9 so that the relay closes its contacts 13 when the direct current energization of the winding 11 exceeds the direct current energization of the winding 12 a predetermined amount. The winding 12 is connected in parallel to a suitable shunt 14 connected in the output circuit of the rectifier 1. In order to prevent improper operation of the relay 10 in response to sudden changes in the direct current load, it may be desirable in some cases to employ a shunt 14 of the inductive type so that the inductances of the shunt 14 and the relay winding 12 are properly balanced.

The relay winding 11 is connected to the input circuit of the power transformer 4 so that it is energized by a direct current which is proportional to the input current of the transformer. This result is obtained by connecting a current transformer 15 to each phase conductor of the power transformer input circuit and connecting one terminal of the secondary windings of these current transformers 15 in Y and connecting the other terminal of each current secondary winding to the two terminals of the relay winding 11 through reversely arranged half-wave rectifiers 16 and 17 so that each half wave of the secondary current of each current transformer 15 flows through the relay winding 11 in the same direction. Due to the phase relationship of the secondary currents of the current transformers 15, it will be evident to those skilled in the art that the direct current through the relay winding 11 is directly proportional to the magnitude of the input current supplied to the power transformer 4.

In order to prevent the relay 10 from effecting the energization of the trip coils 7 and 8 in response to the heavy inrush current when the transformer 4 is connected in service any suitable means, not shown, and examples of which are well known in the art, may be provided for rendering the relay 10 ineffective to energize the trip coils 7 and 8 for a predetermined time after the power transformer is energized.

The relay windings 11 and 12 are normally connected differentially so that the resultant torque produced by the direct currents flowing through these two windings under normal operating conditions is insufficient to cause the relay to close its contacts 13. These contacts 13 are connected in the energizing circuits of the trip coils 7 and 8 so that, when the contacts 13 are closed, the trip coils 7 and 8 are energized to effect the opening of the circuit interrupters 5 and 6.

When an arc-back occurs in the rectifier 1, the current in the output circuit of the rectifier 1 reverses and causes the current in the relay winding 12 to reverse and produce a torque which is in the same direction as the torque produced by the current in the relay winding 11. Consequently, the relay 10 closes its contacts 13 and completes energizing circuits for the trip coils 7 and 8 so as to remove the rectifier 1 from service.

When a fault occurs in the power transformer 4 or any other abnormal condition occurs which causes the input current of the transformer 4 to increase a predetermined amount relative to the output current of the rectifier, the resultant torque produced by the relay windings 11 and 12 is increased to a sufficient value to cause the relay 10 to close its contacts 13 and effect the opening of the circuit interrupters 5 and 6.

Since the number of anode circuits in a power rectifier usually exceeds the number of input phase conductors of the power transformer supplying current to the rectifier, our improved protective arrangement requires considerably less apparatus than would be required if the relay winding 11 were connected to the anode conductors of the rectifier instead of being connected to the input phase conductors of the transformer. Also, with the relay winding connected to the anode conductors, the relay would be nonresponsive to faults in the power transformer.

While we have, in accordance with the Patent Statutes, shown and described our invention as applied to a particular system and as embodying various devices diagrammatically indicated, changes and modifications will be obvious to those skilled in the art, and we therefore aim in the appended claim to cover all such changes and modifications as fall within the true spirit and scope of our invention.

What we claim as new and desire to secure by Letters Patent of the United States is:

An arrangement for effecting the opening of a circuit interrupter interconnecting an alternating current supply circuit and the input circuit of a power transformer supplying current to a power rectifier comprising means for deriving from the input circuit of the power transformer a rectified current proportional to the input current of the transformer, an inductive shunt in the output circuit of the rectifier, and a polarized relay having an operating winding energized by said derived rectified current and a second operating winding connected to said shunt and arranged differentially with respect to said first mentioned winding, said second operating winding and said shunt being inductively balanced to insure proper operation of the relay under changing current conditions in the output circuit of the rectifier.

HERMAN BANY.
HAROLD T. SEELEY.

REFERENCES CITED

The following references are of record in the file of this patent:

UNITED STATES PATENTS

| Number | Name | Date |
| --- | --- | --- |
| 1,792,099 | Kern | Feb. 10, 1931 |
| 1,817,084 | Keller | Aug. 4, 1931 |
| 2,329,735 | Winograd | Sept. 21, 1943 |
| 2,354,158 | Taliaferro | July 18, 1944 |